United States Patent Office 2,841,060
Patented July 1, 1958

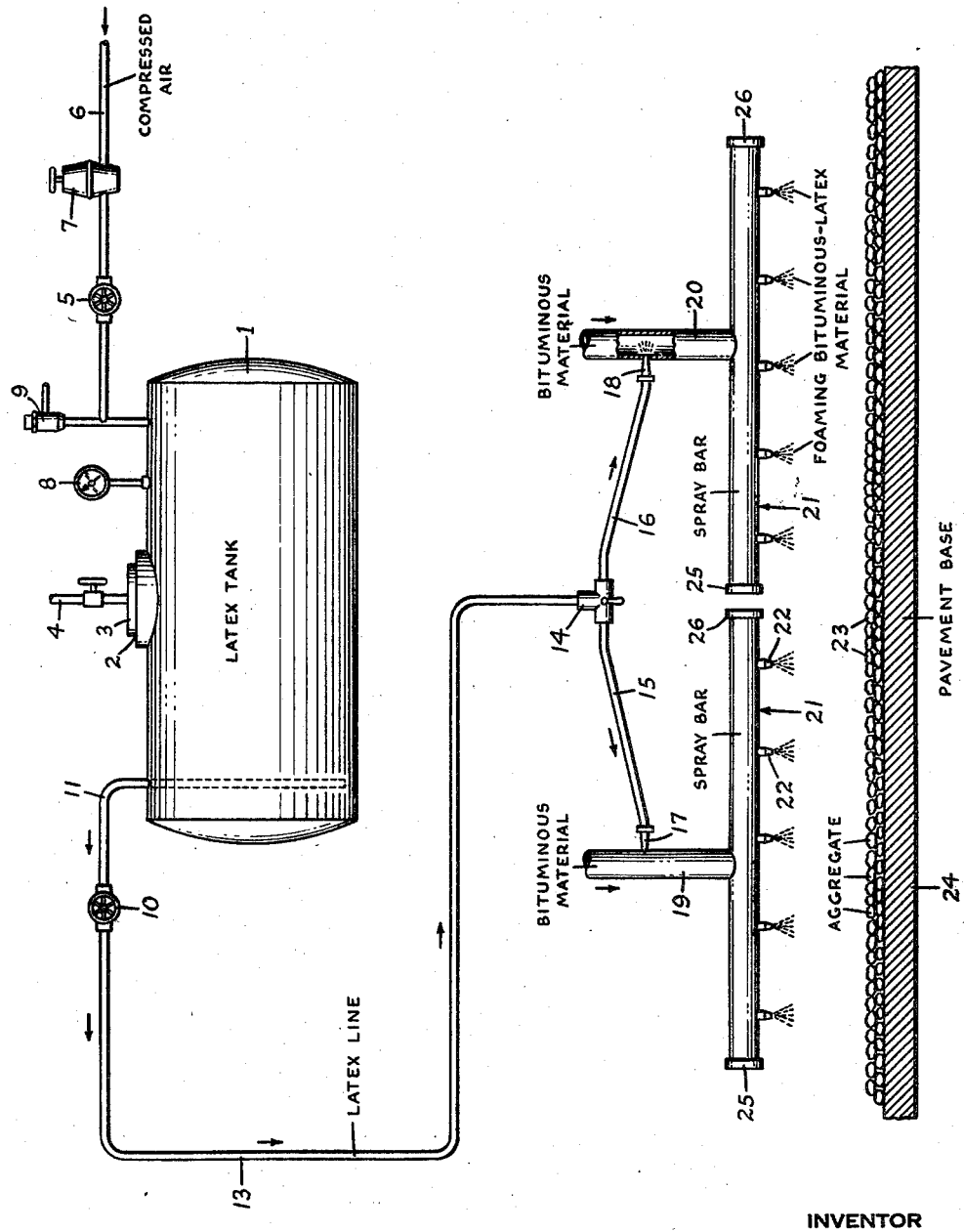

2,841,060

PREPARATION OF RUBBER-CONTAINING BITUMINOUS MACADAM SURFACES

Jesse C. Coppage, Waquoit, Mass., assignor to Allied Chemical & Dye Corporation, New York, N. Y., a corporation of New York Application April 13, 1955, Serial No. 501,098

10 Claims. (Cl. 94—23)

This invention relates to preparation of improved bituminous macadam surface coverings or pavements including particularly those of the so-called "penetration" type, and is more particularly directed to improved procedure for the preparation of such coverings or pavements, and for the bituminous surface treatment of highways and similar surfaces, including airport runways, playgrounds, tennis courts, and the like.

In the bituminous surfacing of highways, etc., different types of surfacing compositions and techniques of application are employed depending on the type of final surface desired, whether the application is to provide a new road or other surface, or to maintain or repair an old one, and also depending on the type of wear to which the surface is to be subjected, etc.

One type of surfacing compositions includes the so-called "bituminous concrete" paving compositions prepared by coating mineral aggregate with bituminous binder, the resulting prepared composition being then applied as a base or road surface. In the preparation of such paving compositions, it is customary to dry the mineral aggregate particles thoroughly, as by heating, and then to coat them with a binder which has been preheated, usually to liquid condition, before mixing with the aggregate. Sometimes small amounts of rubber or rubber-like materials have been incorporated either with the bituminous material or aggregate in the preparation of such compositions. Furthermore, it has been known to apply water to such mixtures after the dried aggregate particles have been coated with bitumen, in order to facilitate mixing of the ingredients and production of a uniform composition for spreading over a prepared surface. In this art, it is also conventional to apply steam to the bituminous material in a separate tank immediately prior to adding to the aggregate in the mixing unit followed by placing the thus formed bituminous concrete composition over the prepared surface, the mixing process usually being carried out in a mixer with rotating paddles or in a rotating drum-type receptacle. Little difficulty has been encountered in producing a uniform distribution and coating of bituminous material throughout the mass of aggregate with respect to preparation of such bituminous concrete compositions.

Another type of surfacing is the so-called "bituminous macadam" type of pavement, in which uncoated aggregate and liquid bituminous materials are combined on the pavement surface itself. Procedures for producing surfaces of such "bituminous macadam" type, include a number of types of treatments, such as, for example "penetration" type, wherein the road or other surface may be first covered with a layer of untreated mineral aggregates such as crushed stone or the like, and then the heat-liquefied bituminous binder, such as asphalt, tar or the like, sprayed over the aggregate by pressure distributors. Such treatment may be followed by one or more "cover" coats in which smaller mineral aggregates are applied to fill the voids between the large aggregates and then the surface is rolled. A final "seal" coat of liquid bituminous material may then be added such as a tar or asphalt, either heat liquefied or thinned or "cut back" by mixing it with a volatile hydrocarbon solvent. Alternatively, a base course of "penetration macadam" type may be constructed on a prepared surface or sub-base over which a surfacing course may be laid. The surfacing course may be either another "penetration" type course or it may be a surface of "bituminous concrete." Such a base course is constructed by procedures similar to those used for a "penetration" type macadam surface course, except that the final "seal coat" is not applied over the base course. Other procedures included in the preparation of "bituminous macadam" and sometimes referred to as "surface treatments" type paving are operations such as maintenance of old surfaces, the application of the "seal" coat and the like, wherein the liquid bituminous material is first spread on the surface, and mineral aggregate is subsequently spread over the bituminous material, followed by rolling or other form of compression to effect coating and binding of the aggregate by the liquefied binder. Thus the term "bituminous macadam" type pavement as used herein relates to all those procedures or parts thereof in which aggregate and liquid bituminous material are combined on the pavement, as described above whether aggregate is first applied to the surface, as in the "penetration" type surfaces or whether binder is applied first, as in "surfacing" treatments, as distinguished from the bituminous concrete type compositions in which binder and aggregate are mixed to form a "concrete" prior to their application to the road or other surface to be paved, and it is to pavements of the "bituminous macadam" type that my invention relates.

The process of laying such "bituminous macadam" types of paving, unlike the laying of the mixed binder-aggregate of the "bituminous concrete," presents major obstacles in obtaining uniform distribution of bituminous material and coating of the mineral aggregate throughout the mass. The reason for this is that the particles of aggregate remain substantially stationary on the prepared surface and solely the movement of the bituminous material must be relied upon for securing penetration of the voids and coating of the mineral aggregate, whereas in production of "bituminous concrete," this coating is accomplished by movement of both the bituminous material and aggregate particles by mixing and agitating them together prior to placing the coated aggregate over the surface to be paved.

Accordingly, it has been found by experience that in making "bituminous macadam" road pavements, the conventional "penetration" method for the application of bituminous binder to the road surface covered by aggregate, involving spraying the binder over the aggregate by means of pressure nozzles or distributors, does not result in satisfactory coating and penetration of the under surfaces of the aggregate. Only those surfaces of aggregate exposed to the direct stream from the nozzles and some flow of the binder before it sets, are adequately coated. Thus, although properly constructed bituminous penetration macadam surfaces are durable and economical, the difficulty of effecting proper penetration of the voids and coating of the aggregate by the bituminous material under the present practice often results in inferior bituminous macadam surfaces, hence precluding wide acceptance of such types of pavement.

Furthermore, adhesion of the binder to the aggregate was often poor, due partly to lack of adequate contact of binder and aggregate such as is readily secured in "bituminous concrete" mixing procedures, and also partly to the moisture present in the raw, undried mineral aggregate, preventing penetration of the aggregate pores by the bituminous binder.

As noted above, while water has sometimes been employed in preparing uniform mixtures of bituminous material and aggregate as so-called "bituminous concrete" compositions, i. e. precoated aggregates for application to road surfaces, use of water or other aqueous materials in the preparation of "penetration" type bituminous macadam pavements has commonly been avoided because it has been considered that the presence of free water in bituminous binders or on the mineral aggregate is highly objectionable due to impairment of adhesion between bituminous binder and the mineral aggregate particles.

Furthermore in certain surface treatments of the "bituminous macadam" type, for example, renewal of the wearing surface of an existing highway, or the finishing of a new roadway, the general practice is to apply a "seal coat," i. e. to uniformly distribute bituminous binder on the existing surface and to cover the binder with small size mineral aggregate. In addition to the difficulties in obtaining thorough covering of the aggregate, a most serious drawback in this latter type of application is, that, particularly in cold weather, the binder sets before the cover aggregate can be applied, aggravating the poor adhesion between the binder and aggregate. Accordingly, means to effect retardation in set of the bituminous binder to thereby permit a longer period of time within which the cover aggregate may be applied, have long been sought. Further, where cut-back grades of bituminous material such as asphalt (formed by blending the bitumen with a petroleum or aromatic solvent) are used for surface treatment, it is frequently necessary that they be applied at temperatures considerably above the flash point of the solvent. Since extremely volatile vapors are evolved through such application, the employment of cut-back grades of bitumen for surface treatment is accordingly hazardous.

As pointed out above, it is known to incorporate small amounts of rubber and rubber-like materials in bituminous binders to increase the elasticity and ductility of the resulting binders and to reduce their temperature susceptibilities. Such additions have usually taken the form of additions of solid, vulcanized or unvulcanized rubber powder, or liquefied rubber, to hot bituminous material and to bituminous paving mixtures during the process of mixing binder and aggregate in the preparation of "bituminous concretes." Rubber in the form of latex has been added to bituminous emulsions, in the preparation of bituminous paints and other compositions. On the other hand, while some attempts have been made to prepare bituminous, rubber-containing compositions by the addition of rubber latices to hot liquid or molten bituminous binders, such procedures have produced compositions entirely unadapted for use in bituminous macadams of the "penetration" or "surface" type treatments. Thus, if the latex is blended with bituminous material at temperatures below about 225° F. the resulting rubberized bituminous binder is highly viscous and has insufficient flow characteristics to properly coat the bituminous aggregate on the surface, and moreover, sets so rapidly that adhesion and penetration of the aggregate, whether on the prepared surface at the time of application of the binder, or applied subsequent to the binder, is not obtained. If the latex is blended with the liquid bituminous binder at temperatures appreciably above about 400° F. the resulting rubberized binder, while possessing the desired lower viscosity, nevertheless, if held at temperatures above about 350° F. for even short periods, sufficient to effect thorough coating of aggregates, may lose the desired rubber-imparting characteristics of high elasticity and low temperature susceptibility.

A primary object of the present invention is to provide an improved procedure for preparing rubber-containing bituminous macadam pavements or parts thereof, whether of the "penetration" or "surface" type.

A further object is to provide improved procedure for preparing rubber-containing bituminous macadam bases and surfaces or pavements of the "penetration" type in which a more thorough penetration of the voids and covering of the surfaces of the aggregate is accomplished while at the same time obtaining good adhesion between the bituminous material and aggregate particles.

Another object of the invention is to provide a process for readily incorporating adequate quantities of rubber in the form of rubber dispersions, into heat liquefied bituminous binder materials adapted for application to paving surfaces.

Another object of the invention is to provide a procedure in which retardation of the set of the rubber-containing bituminous binder is effected sufficiently so that cover aggregate applied thereon will adhere strongly to the bituminous material.

Another object is to afford improved bituminous macadam "seal coat" type surface treatment of roads, highways and similar surfaces, applied together with or separately from the main "penetration" procedure, particularly avoiding the use of cut-back grades of bitumen and the consequent evolution of hazardous vapors therefrom.

Another object of the invention is to provide a process for making tough, highly elastic, wear-resistant, rubber-containing bituminous macadam pavements economically, using standard equipment.

Other objects and advantages will appear as the description of the invention proceeds.

The above and other objects are accomplished according to my invention wherein a controlled amount of a natural or synthetic rubber aqueous dispersion is injected or introduced into a heat-liquefied bituminous material in a confined space at a temperature between about 225° F. and about 400° F., and, after thorough incorporation therein, the resulting mixture is released from the confined space, whereby foaming takes place, and is applied in foaming condition to a prepared surface whereon it is brought into contact with a layer of mineral aggregate which is either present at the time of the application of the foaming mixture or is placed thereon prior to cessation of foaming.

The single drawing illustrates a suitable arrangement for practicing the invention comprising a latex tank connected to a conventional spray type distributor commonly used in applying heat liquefied bitumen to road and other surfaces.

In carrying out the process according to the invention, asphalt or tar bituminous binder is heated in a confined space to a temperature between about 225° F. and about 400° F., to convert it to the fluid state, and the hot liquid bitumen is subjected to pressure, for example, between about 25 and about 60 pounds per square inch gauge, whereupon it is in proper condition for efficient spraying.

The aqueous rubber dispersion or latex, at ambient air temperature or any convenient temperature below the boiling point of water, is also subjected to pressure; the pressure on the latex, however, being in excess of the pressure on the bituminous material, for example between about 5 and about 40 pounds per square inch in excess of that on the bituminous material. The latex and hot bituminous binder are then mixed in the desired proportions, preferably by an orifice or nozzle injection of the latex into the bituminous binder spray line just prior to the spraying of the mixture.

When the latex is injected into the hot bituminous material in the confined space, the water contained therein is transformed almost immediately into steam. The turbulence thus produced effects thorough mixture and incorporation of the rubber latex and the bituminous material in the confined space liberating the emulsified rubber particles which immediately dissolve in and blend with the hot bituminous material. Release of the turbulent, steam-containing mixture to the lower pressure of the atmosphere, as through distributor outlets, causes the bituminous-latex mixture to foam and expand as it is distributed or sprayed over the prepared surface.

In preparing an essentially new bituminous macadam road surface utilizing the principles of the invention, a layer of coarse aggregate, varying, for example, from 1 to 3 inches in size, is spread uniformly to a desired depth, for example, of about 2½ to about 3½ inches, over a prepared base or surface and rolled in place. The mixture of hot foaming binder, prepared as indicated above, is then distributed under pressure over the layer of coarse aggregate, the quantity of binder applied per square yard of surface varying with the depth of the aggregate mass.

Upon application, the foaming binder penetrates to the base surface and then rises and falls a plurality of times throughout the depth of the aggregate layer, thoroughly penetrating the voids between the aggregate particles and coating all exposed surfaces, including the under surfaces, of the aggregate particles and also coating the base surface, while at the same time developing strong adhesion between the latex-bituminous material binder and the aggregate particles, and providing a tough, wear-resistant surface covering or pavement. After adequate penetration of the coarse aggregate has been effected, a layer of finer aggregate is then applied over the layer of coarse aggregate and bituminous material, such as "chink" or "choke" stone, to fill the surface voids. This surface is then rolled, and a seal coat of foaming bituminous-latex prepared as noted above, is then distributed under pressure over the second layer of aggregate, the amount of binder employed per square yard of surface being ordinarily less than that first applied over the coarse aggregate. Finally, a third layer of fine aggregate is applied over the seal coat before foaming has entirely ceased, to function as a cover surface, and is rolled in place.

When the prepared surface is a disintegrated or worn existing surface, or a smooth surface which is to receive a surface treatment, the foaming mixture is applied to the prepared surface, and, before the foam is completely dissipated, a cover coat, usually of fine aggregates such as those of the "chink" or "choke" stone type, is applied to the mixture on the prepared surface. The mixture continues to foam for a considerable period after application, for example, the material foaming visibly for several minutes, and, after visible foam has appeared to subside, invisible foam, effective to produce the advantageous distribution of binder on the subsequently applied small size mineral aggregates may persist for as long as an hour or more. Before the foam, including invisible foam, has completely dissipated, the spongy binder is covered with small size mineral aggregates, e. g. from ¼ to ½ inch size. The latex injection procedure of the invention is particularly advantageous for surface treatments of the above type, since it tends to retard the set of the bituminous material, thus permitting a longer period of time within which a cover of aggregate may be applied thereon. Further, use of my process in surface treatment avoids hot application of cut-back grades of bitumen for this purpose and the resultant evolution of dangerous vapors.

The bituminous binder materials employed in the practice of my invention may be either asphalt or tar, including coal tar and water gas tars of road tar types. Suitable bituminous materials are those which, at normal temperatures, are solid to highly viscous semi-solid substances exhibiting at least some degree of cold flow, and which on heating to the indicated temperatures will readily pass the spray nozzles of the conventional distributor apparatus. The asphaltic materials of the invention thus are those which have "penetration" values ranging from 50 to 300, usually 85 to 120, according to the Standard penetration test D–5–52 defined in "ASTM Standards on Bituminous Materials for Highway Construction, Waterproofing and Roofing," April 1953, page 1331, published by the American Society for Testing Materials. The tar materials used in the process of the invention have float test values at 50° C. ranging from 40 to 250 seconds, according to the "Standard Method of Float Test for Bituminous Materials" designated D–139–49, as defined in the above ASTM publication for April 1953 on page 1323.

The quantity of bituminous binder applied to aggregate already on the prepared surface, may vary with the depth of the penetration course and the closeness of compaction of the aggregate particles, for example, with a penetration course about 3 inches thick, from 1 to 2 gallons of liquefied binder may be utilized per square yard of surface. For use as a seal coat, or for other applications to existing surfaces, smaller quantities of binder may be utilized, for example, from about 0.1 to about 1.0 gallon per square yard.

The temperature of the liquid bituminous material at the time of injection of the latex is critical, and should not substantially exceed 400° F., nor be below about 225° F. Preferable temperatures are between about 250° F. and about 375° F. depending on the type of binder and its consistency, the more viscous binders requiring the higher temperatures. Introduction of the aqueous rubber dispersion (which is effected with the latex at temperatures below the boiling point of water, usually at about ambient air temperatures), immediately reduces the temperature of the bitumen, both by the cooling effect of the water and by the generation of steam. Thus, upon mixing of bituminous material and latex at the temperatures and in the proportions indicated, the temperature is quickly reduced below that which, if prolonged, might produce a detrimental effect on the desired rubber characteristics, and, at the time of application to the prepared surface is usually not higher than about 300° F.

The rubber dispersion used for injection into the hot bituminous material in accordance with the invention may be an aqueous natural rubber dispersion or latex or may be a dispersion or latex of a synthetic rubber, particularly those of the "GRS" type, i. e. butadiene-styrene copolymers, and also those of the "GRA" (butadiene-acrylonitrile) and neoprene types. Any of the dispersions may be in the form of new rubbers or in the form of dispersions of reclaimed rubber. They may be either vulcanized or unvulcanized. Whenever the expression "rubber dispersion" is used in the specification and claims it is intended to include dispersions of all the types mentioned above. Natural rubber dispersions are preferred, and of the synthetic rubbers, those of the GRS type.

A feature of prime importance in the practice of the invention is the amount and composition of the latex injected into the bituminous binder material. I have found that for obtaining best results, at least about 0.25% by weight of rubber material should be present in the bituminous binder material after its solidification on the surface or aggregate, and that quantities up to about 5% by weight may be incorporated to obtain beneficial characteristics of the type indicated. Preferably amounts between about 0.25% and about .3% will be incorporated.

The latex introduced must be of such a composition that it will not only provide the desired proportion of rubber in the finished binder composition, but also will supply an amount of water suitable for inducing the desired degree of foaming. In general, an amount of water equivalent to as low as about 1.5 gallons per 1000 galions of bitumen is sufficient to bring about the necessary foaming, and amounts as high as about 90 gallons of water may be tolerated. Higher amounts of water tend to lower the temperature and turbulence of the mixture and decrease the foaming. Accordingly, I prefer to use proportions of latex which will supply water within the above limits, that is, between about 5 and about 100 gallons of a 50% water-containing latex per 1000 gallons of bitumen, and between about 6 and about 125 gallons of a 60% water-containing latex. Because of this high tolerance for water in the preparation and application of the foaming mixture of the invention, it is possible to incorporate proportions of rubber as high as about 5% by weight, based on the weight of the final binder film without exceeding the tolerance of the system for water. Latices containing the conventional proportions of water, for example, between about 40% and about 60% water may be employed. Using such latices, I have found that a quantity of between about 4 and 150 gallons of latex per 1000 gallons of bituminous material may be used to produce the beneficial foaming characteristics and the advantageous properties imparted by the rubber upon the bituminous binder material. Using latices containing 40%, 50% and 60% water, together with 60%, 50% and 40% of rubber respectively, suitable approximate proportions of latex to asphalt are shown in the following table, based on asphalts and rubber latices having specific gravities of approximately 1. Table II shows the approximate amount of water provided per 1000 gallons of asphalt by the introduction of the amounts of latex shown in Table I.

TABLE I

*Approximate gallons of latex required for various concentrations of rubber in asphalt film on aggregate or pavement*

| Approximate Weight Percent of Rubber in Asphalt Film | Gallons of Latex per 1,000 Gallons of Asphalt for Latex Containing— | | |
|---|---|---|---|
| | 40% water | 50% water | 60% water |
| 0.25 | 4.1 | 5 | 6.25 |
| 0.5 | 8.3 | 10 | 12.5 |
| 1 | 16.7 | 20 | 25 |
| 2 | 33.4 | 40 | 50 |
| 3 | 50.0 | 60 | 75 |
| 5 | 83.3 | 100 | 125 |

TABLE II

*Gallons of water introduced into asphalt mixture at various rubber concentrations*

| Approximate Weight Percent of Rubber In Asphalt Film | Gallons of Water Introduced by Latices of Concentrations | | |
|---|---|---|---|
| | 40% | 50% | 60% |
| 0.25 | 1.66 | 2.5 | 3.75 |
| 0.5 | 3.33 | 5 | 7.5 |
| 1 | 6.7 | 10 | 15 |
| 2 | 13.4 | 20 | 30 |
| 3 | 20.0 | 30 | 45 |
| 5 | 33.3 | 50 | 75 |

If tars are employed as the bituminous material rather than asphalt, slightly greater volumes of latex will be used to obtain the same weight percentages of rubber. These amounts may readily be calculated from the specific gravities of such tars, which may suitably be from about 1.2 to about 1.25. These added amounts may raise the total amount of water added per thousand gallons of tar to a maximum of about 90 gallons, and the amount of latex to as high as about 150 gallons.

The aggregate employed may be broken stone of varying sizes, crushed slag, gravel or the like, and may be in the form of large or small lumps or particles. Regardless of the size of the aggregate utilized, the expanded foaming mixture of latex with asphalt or tar fills the voids of the aggregate throughout the depth of the penetration course, thus providing uniform distribution of the bituminous binder material throughout the aggregate mass, and in the case of "cover" coats adequately binds them to each other and to the base. An advantage of the process of my invention is that the aggregate need not be dried before application of the binder but may be used in raw undried state, the foaming binder adhering well in spite of the presence of moisture in the aggregate pores.

The invention may be practiced in connection with conventional pressure spray type distributors commonly used in applying heat liquefied bitumen to surfaces to be treated. Such device may be a conventional distributor truck or simply a nozzle attached to a flexible hose which is operated by hand, or any other suitable device. In practicing the invention in connection with the device shown in the drawing, tank 1 is filled with the aqueous rubber or synthetic rubber later for dispersion through inlet 2 and the tank sealed with cover 3 having vent cock 4 thereon. The latex tank may be located on the running board or in the back or side compartments in the distributor truck. Compressed air from the truck air brake system or an auxiliary source is then turned on and valve 5 is opened. Air pressure is then built up in the latex tank by the air flowing through pipe 6, the air pressure previously having been adjusted by means of pressure regulator 7. A pressure gauge 8 is positioned on the top of latex tank 1 and a pressure relief valve 9 connecting with tank 1 is provided as a safety precaution. Valve 10 is then opened, allowing latex from the tank 1 to be forced through line 11 to the three-way cock 14 where the latex is diverted in opposite directions through lines 15 and 16 and is finally discharged through nozzles 17 and 18 into the spray bar lines 19 and 20 containing the hot binder.

Bituminous binder material, e. g. asphalt or tar heated to fluidity, and contained in a tank (not shown) mounted on the distributor truck is conveyed under pressure through spray bar lines 19 and 20 where it comes into contact with the latex being discharged through nozzles 17 and 18 into the spray bar lines. The hot bituminous binder material then passes into horizontal spray bars 21 having their ends sealed by solid members 25 and 26. Turbulence, occasioned by introduction of latex into the hot, pressurized bitumen and conversion of at least part of the water therein to steam, brings about thorough incorporation of the latex into the bituminous material in the spray bar lines, from whence the mixture is discharged or sprayed under pressure in foaming streams through a series of spray nozzles 22 positioned on the under side of each spray bar along its length, and the foaming binder is distributed uniformly over a layer of aggregate 23 evenly spread over a pavement or prepared base 24, or onto any prepared surface to which aggregate will subsequently be applied.

The following specific examples further illustrate my invention. Parts are by weight except as otherwise noted.

*Example 1*

(Asphalt penetration macadam surface course—single seal coat)

Asphalt (having a penetration of 85 to 100 according to the Standard ASTM penetration test) is heated to fluidity at a temperature of 360° F. in a closed system and subjected to a pressure of 25 pounds per square inch. A natural rubber latex containing about 50% of rubber and about 50% of water is then injected into the liquid asphalt under a total pressure of 50 pounds per square inch, corresponding to an effective pressure of the latex on the asphalt of about 25 pounds per square inch, the rate of flow of latex into the asphalt being about 6.5 gallons per minute, amounting to about 40 gallons of latex per 1000 gallons of asphalt. On contact of the latex with the hot asphalt, the water therein is converted to steam causing turbulence and effective blending of asphalt and rubber material. The alphalt-rubber mixture is released through spray nozzles and distributed over a prepared compacted surface of 2½ inch size trap rock aggregate laid to a depth of about 3½ inches over a prepared road base.

Upon release of the latex rubber-asphalt mixture from the pressure system into the ambient lower pressure atmosphere, the mixture foams and expands and is spread on the aggregate in this foaming condition. The mixture penetrates the voids, passes to the bottom of the layer, and rises again through the aggregate voids to the top of the course, repeating this downward and upward motion several times in repeated surges, thus thoroughly coating all exposed surfaces of the aggregate particles, including the road base.

After cessation of the foaming, and substantial evaporation of the water of the latex, the resulting elastic binder film on the above coarse aggregate contains about 2% of rubber and adheres firmly to the aggregate. In the above operations about 1.7 gallons of asphalt-latex binder is thus applied per square yard of road surface. The surface voids are then filled with "chink" or "choke" stone of about ½ inch size, using approximately 25 pounds of stone per square yard. The resulting course is "broomed" and rolled with a power roller until the surface voids are completely filled, leaving the top of the coarse aggregate exposed.

Excess "chink" or "choke" stone is then removed by "brooming" and, to the surface thus formed, a seal coat of about ¾ gallon per square yard of latex rubber-asphalt binder, foamed and formulated as described above, is applied under pressure, followed after about 30 to 60 minutes by application of a cover of about 30 pounds per square yard of ½ inch size stone. The cover aggregate is distributed uniformly by brooming and rolling into place.

Part of the "cover" aggregate applied about one hour after the application of the binder, after rolling was firmly held in place indicating that a definite "retarded" set of the bitumen resulted from use of this process, thus permitting a longer period of time within which cover aggregate can be applied. A similar bituminous composition, without the aqueous latex injection binder if thus applied would "set" within a period of about 5 to 15 minutes to a point where "cover" aggregate could not be firmly incorporated. For this reason "cutback" or solvent thinned bituminous material is usually used for such seal coat rather than heat liquefied bitumen.

The penetration macadam surface course, constructed as described above, resulted in production of a tough, durable, wear-resistant macadam pavement.

Example 2

(Penetration macadam surface course—double seal coat)

Coarse aggregate is spread uniformly to a depth of about 3½ inches over a prepared road base using a stone spreader and the aggregate is rolled with a three-wheel roller weighing not less than eight tons, until the particles of aggregate become thoroughly interlocked. About 1.7 gallons of hot liquefied bituminous binder per square yard of surface, into which latex has been previously injected under the conditions noted in Example 1, is sprayed in a foaming condition under a pressure of about 25 pounds per square inch (as in Example 1) over the aggregate. The surface voids are then filled with "choke" aggregate, of a size smaller than the aggregate first applied, and the course is broomed and rolled until the surface voids are completely filled, leaving the top of the coarse aggregate exposed. To the surface thus foamed is applied under pressure, a seal coat of about ½ gallon of hot bituminous binder treated with latex as noted directly above, per square yard of surface, followed after about 30 minutes by application of a cover of about 30 lbs. of aggregate of small size (½ inch maximum) per square yard. This cover is again broomed, rolled into place and excess cover removed.

To the surface thus formed is applied under pressure, a second seal coat of about ⅜ gallon of hot bituminous binder treated with latex as noted directly above, per square yard of surface, followed after about 30 to 60 minutes by application of a cover of about 25 lbs. of aggregate of small size (⅜ inch maximum) per square yard. This cover is then broomed and rolled into place resulting in tough wear-resistant road surface.

Example 3

(Asphalt penetration macadam base course)

Into approximately 1500 gallons of 85 to 100 penetration asphalt heated to 370° F. under a pressure of about 30 lbs./sq. in., there is injected 60 gallons of a natural rubber latex containing 50% water and 50% rubber, at a pressure of 65 p. s. i. corresponding to an effective pressure of the latex on the asphalt of 35 p. s. i. The resulting mixture is distributed under a pressure of about 30 p. s. i. as a foaming mixture onto a well consolidated road surface consisting of coarse, commercial limestone aggregate of 2 inch maximum size, spread uniformly to a depth of about 3½ inches over a prepared road base, in an amount equivalent to 1.7 gallons per square yard of surface. The foaming mixture penetrates the voids and completely covers all exposed portions of the aggregate, including the road base, as in Example 1. The surface voids are then filled with "choke" aggregate, of a size smaller than the aggregate first applied, and the course is broomed and rolled with a power roller, until the surface voids are completely filled, leaving the top of the coarse aggregate exposed, resulting in a tough, durable bituminous macadam base course for ultimate covering with a seal coat or any type of surface course at a future date.

Example 4

(Tar penetration macadam base course)

Tar binder (200 seconds float test at 50° C.) is heated to 275° F. and 25 pounds per square inch pressure is applied thereto. A natural rubber latex containing 50% water and 50% rubber is then injected through an orifice under a total pressure of 40 pounds per square inch (corresponding to an effective pressure of the latex on the tar binder of about 15 pounds per square inch). The flow of latex into the tar binder is at rate of 20 gallons of latex per 1000 gallons of binder. The foamy binder is distributed over a prepared compacted surface of 2½ inch size trap rock aggregate laid to a depth of approximately 3 inches. The foam rises approximately two to four or more inches above the surface of the aggregate in a series of rises and falls and subsides in approximately one minute. The foamy latex-tar binder penetrated the complete depth of the stone layer and uniformly coated the aggregate, except for those portions of the surface in direct contact with each other. Even though the stone is cold (air temperature 33° F.) and damp, good adhesion is obtained, and the elastic tar film can not readily be peeled from the stone.

After application of about 1.7 gallons of above binder per square yard of road surface, the surface voids are filled with ½ inch size stone, using about 25 pounds of stone per square yard. The course is broomed and rolled with a power roller until thoroughly compacted, with the surface voids completely filled, but leaving the top of the coarse aggregate exposed, thus providing a tough durable macadam base course for ultimate covering at a future date with a seal coat or any type of surface course.

After cessation of the foaming and substantial evaporation of the water of the latex, the resulting elastic binder film on the coarse aggregate contains about 0.8% by weight of rubber solids.

Example 5
(Surface treatment)

100 to 120 penetration asphalt binder is headed to 350° F. and subjected to a pressure of 25 pounds per square inch. A synthetic rubber latex of the GR–S type containing 60% water and 40% rubber is injected into the asphalt under a total pressure of 30 p. s. i. (corresponding to an effective pressure of the latex on the asphalt of about 5 p. s. i.). The flow of latex into the asphalt is at a rate of about 25 gallons of latex per 1000 gallons of asphalt. The resulting latex-bitumen mixture is applied to a worn existing surface in a quantity of about 0.4 gallon per square yard. Upon application to the surface the foam rises to a height of three or four inches, subsiding in about one minute to leave a spongy film of binder. Clean, crushed, rock aggregate of ½ to ⅛ inch size is spread on the binder film and becomes firmly embedded in the foamed layer even when applied one hour or more after the binder. This "delayed" set of the mixture thus permits an adequate time interval for application of cover aggregate, after application of the binder, whereas without the addition of the latex the same binder would "set" within about 5 to 15 minutes to a point where cover aggregate could not satisfactorily be incorporated therein. After cessation of the foaming and substantial evaporation of water of the latex, the resulting elastic binder film applied to the road surface contained about 1% of rubber solids. The resultant surface treatment was tough and wear resistant.

Example 6
(Penetration, macadam base course)

There were injected into 1020 gallons of 100 to 120 penetration asphalt heated to 370° F., under a pressure of 26 p. s. i., six gallons of a synthetic GR–S (cream latex) rubber emulsion containing 40% water and 60% rubber at a temperature of 75° F. and a pressure of 60 pounds per square inch or an effective latex pressure of 34 pounds per square inch on the asphalt. The resulting foamy mixture was distributed at a rate of 1½ gallons per square yard onto a well consolidated course of aggregate consisting of 2½ inch size clean, rough textured crushed granite spread uniformly to a depth of about 3½ inches over a prepared road base. The depth of foam rose approximately ½ inch above the top surface of the stone. The percentage of rubber in the final film on the stone was 0.35. This percentage increased the ductility of the asphalt to such an extent that a particle of coated stone could be lifted 2 feet or more above the road surface without rupturing the asphalt film. The foaming mixture penetrated the voids and completely covered all exposed surfaces of the aggregate, including the road base. The surface was then covered with ½ inch crushed granite, broomed and rolled with a three wheel, eight ton power roller until the course was compacted and the surface voids completely filled, leaving the top of the coarse aggregate exposed, resulting in a tough, durable, wear-resistant base course for immediate use by traffic.

Example 7
(Penetration, macadam base course)

26 gallons of an aqueous emulsion of GR–S synthetic rubber latex containing 57.5% water and 42.5% rubber solids under a pressure of 45 p. s. i. was injected into 1900 gallons of 100 to 120 penetration petroleum asphalt, heated to 390° F. under a pressure of 26 p. s. i., thus giving an effective latex pressure of 19 pounds per square inch on the asphalt. Application was made at a rate of 1.46 gallons per square yard of road surface onto 2½ inch size crushed granite, following the procedure described in Example 6. The percentage of rubber in the final film was 0.58. The foam rose approximately 2 inches above the surface of the stone. The ductility of the asphalt-rubber film on the aggregate was such that an individual coated particle could be lifted 6 feet above the road surface without rupturing the film. The adhesion of the film to the coarse aggregate was excellent. The thoroughness of coating, application of ½ inch "chink" stone, brooming of surface and rolling followed the procedure described in Example 6.

Example 8
(Penetration, macadam base course)

24 gallons of an aqueous emulsion of GR–S synthetic rubber latex containing 66.4% water and 33.6% rubber solids, under a pressure of 50 p. s. i. was injected into 2171 gallons of 100 to 120 penetration asphalt, heated to 390° F. under a pressure of 26 p. s. i., thus giving an effective latex pressure of 24 pounds per square inch on the asphalt. The application rate was 1.55 gallons per square yard onto 2½ inch size crushed granite following the same application procedure as described in Example 6. The foam rose 2 inches above the top surface of the stone. The percentage of rubber in the final latex-asphalt film on the coarse aggregate was 0.37%. The ductility and adhesion of this film was identical to that described in Example 7. The completion of the base course was the same in all respects as described in Example 6.

While the above describes the preferred embodiments of the invention, it will be understood that departures may be made therefrom within the scope of the specification and claims.

I claim:

1. In a process for preparing a bituminous macadam pavement, the steps which comprise, introducing a controlled amount of an aqueous rubber dispersion under a superatmospheric pressure of at least about 30 pounds per square inch gauge, into heat-liquefied bituminous material maintained at a superatmospheric pressure less than that on the rubber dispersion, but at least about 25 pounds per square inch gauge, in a confined space at a temperature between about 225° F. and about 400° F., the amount of water in the dispersion being between about 40% and about 60% by weight, the balance being essentially rubber, the amount of dispersion introduced being between about 4 gallons and about 150 gallons per 1000 gallons of bituminous material, thereafter releasing the resulting mixture from the confined space, thereby producing a foaming mixture, applying said foaming mixture to a prepared surface and causing said mixture to come in contact with a layer of mineral aggregate on said prepared surface while said mixture is in a foaming condition.

2. The process of claim 1 wherein the dispersion is a natural rubber latex.

3. The process of claim 1 wherein the bituminous material is asphalt.

4. The process of claim 1 wherein the dispersion is a synthetic rubber latex.

5. The process of claim 1 wherein the bituminous material is tar.

6. The process of claim 1 wherein the foaming mixture is applied to a prepared surface having thereon a layer of mineral aggregate.

7. The process of claim 1 wherein the foaming mixture is first applied to a prepared surface and a layer of aggregate is placed thereon.

8. The process of claim 1 wherein the latex is substantially continuously introduced into the hot bituminous binder in the spray line just prior to spraying of the mixture.

9. The process of claim 2 wherein the latex contains about 50% water and is mixed with the bituminous material in the proportion of about 40 gallons per 1000 gallons of bituminous material, and the mixture is applied to a layer of aggregate approximately 3 inches deep in an amount equivalent to between about 1 and about 2 gallons per square yard of surface.

10. The process of claim 2 wherein the latex contains about 40% water and is mixed with the bituminous binder in proportions between about 5 gallons and about 15 gallons per 100 gallons of bituminous material, and the mixture is applied to a layer of aggregate approximately 3½ inches deep in an amount equivalent to between about 1 gallon and about 2 gallons per square yard of surface.

References Cited in the file of this patent

UNITED STATES PATENTS

| | | |
|---|---|---|
| 1,563,410 | Weiss | Dec. 1, 1925 |
| 1,803,248 | Hack | Apr. 28, 1931 |
| 2,283,192 | Ditto | May 19, 1942 |
| 2,686,166 | Taylor | Aug. 10, 1954 |
| 2,700,655 | Endres | Jan. 25, 1955 |